United States Patent
Brown

[15] 3,676,793
[45] July 11, 1972

[54] DIGITAL FREQUENCY LOCK GENERATOR

[72] Inventor: Bruce J. Brown, Alexandria, Va.

[73] Assignee: The United States of America as represented by the Secretary of the Navy

[22] Filed: April 19, 1971

[21] Appl. No.: 134,942

[52] U.S. Cl. .................................. 331/1 A, 331/14, 331/17
[51] Int. Cl. .......................................................... H03b 3/04
[58] Field of Search .......................................... 331/1, 17, 14

[56] References Cited

UNITED STATES PATENTS 3,287,655  11/1966  Venn et al..............................331/1 A Primary Examiner—John Kominski
Attorney—R. S. Sciascia, Arthur L. Branning and Philip Schneider

[57] ABSTRACT

A digital frequency lock generator having an input-output pulse-train counter, A-store register, B-store register, comparator, forward-reverse counter, free-running, pulsed-output frequency synthesizer and control logic circuit for timing the components requiring setting and resetting pulses. The time interval between the first input pulse and the next succeeding output pulse is measured and stored in the A-store register. The time interval between the second input pulse and the succeeding output pulse is measured and stored in the B-store register. The comparator compares the two time intervals and sends a pulse to that terminal of the forward-reverse counter which will act to correct the difference in time intervals. The output of the forward-reverse counter commands the frequency of the frequency synthesizer pulse train output. The circuit is then set for the next two pulse-pair measurements.

9 Claims, 5 Drawing Figures

Patented July 11, 1972
3,676,793
3 Sheets-Sheet 1
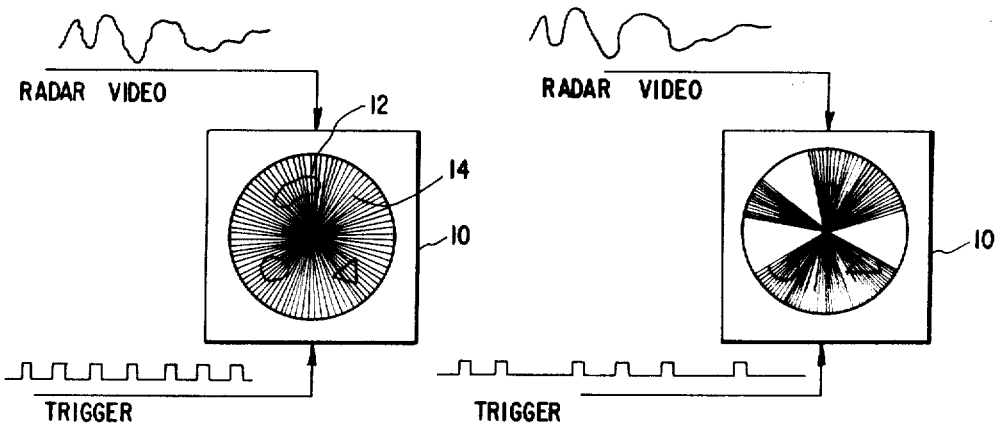
FIG. 1A
FIG. 1B
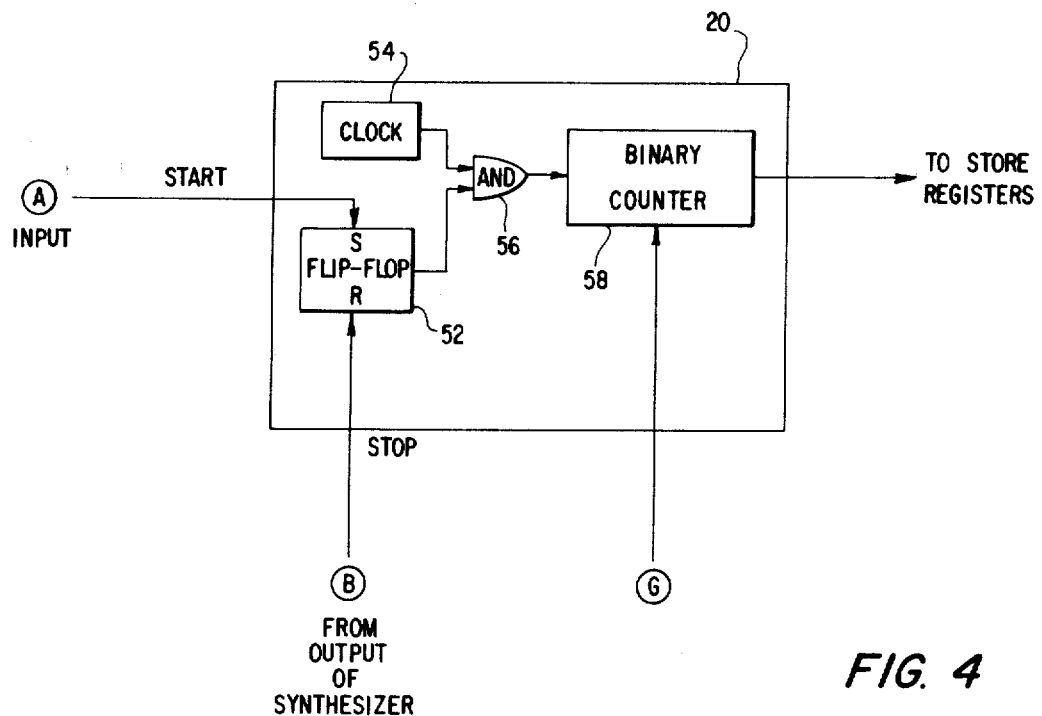
FIG. 4
INVENTOR
BRUCE J. BROWN
Philip Schneider
Arthur J. Freeney
ATTORNEYS

INVENTOR
BRUCE J. BROWN

ATTORNEYS

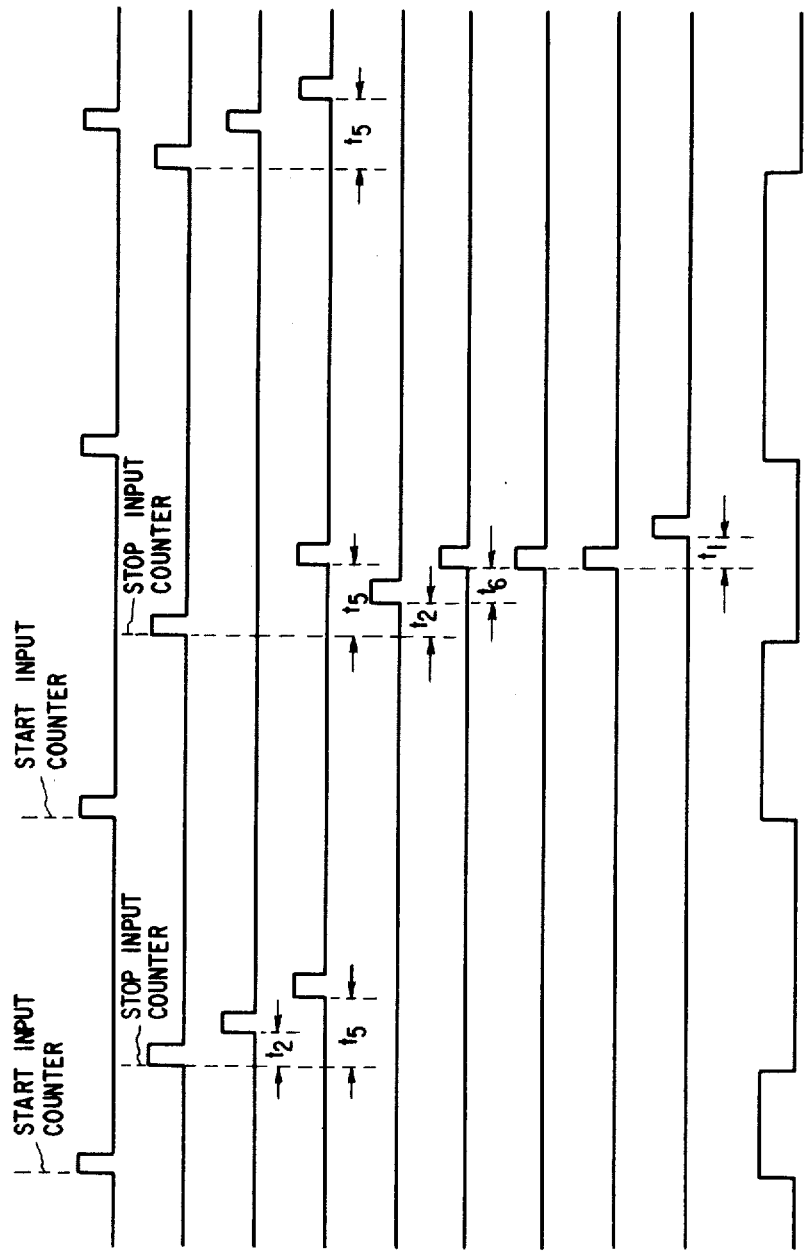

DIGITAL FREQUENCY LOCK GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a pulse-train generator and especially to one which generates an output pulse train which is automatically locked to the pulse repetition rate, or frequency, of an input pulse train.

In many instances, a PPI radar video display receives its input trigger pulses via a radio data link. As a result of atmospheric fading and low signal-to-noise ratios, detection of some of the trigger pulses may not occur. Whenever one of these pulses is not detected, a range line is not generated. The end result is a failure to display all of the video data on the PPI scope.

One solution to this problem employs a highly accurate free-running frequency synthesizer which is used to trigger the PPI at a pulse repetition rate equal to that of the trigger pulse train rather than using the receiver output directly. This insures that the PPI is constantly triggered but requires a precise adjustment of the frequency synthesizer which is performed manually.

SUMMARY OF THE INVENTION

The invention comprises frequency-comparison means to compare the frequencies of the input and output pulse trains and to provide a signal to means for changing the frequency of an output pulse-train generator so as to cause the output frequency to be equal to the input frequency at all times. Control means is employed to start and stop components of the frequency-comparison means. By inserting a numerical indicator after the frequency-changing means, it is possible to make precise frequency measurements of the input pulse train even though some of the pulses may be missing.

An object of this invention is to provide an output pulse train having a pulse repetition rate, or frequency, which is automatically maintained equal to that of an incoming pulse train.

Another object of this invention is to provide a generator which will provide a pulse train output equal in frequency to that of an input pulse train even when some of the pulses in the input pulse train are missing.

A further object is to provide a digital frequency lock generator which will have a wide bandwidth of capture.

Yet another object is to provide means for making accurate frequency measurements of an incoming pulse train even though some of the pulses in the train are missing.

Other objects, advantages and novel features of the invention will become apparent from the following detailed description of the invention when considered in conjunction with the accompanying drawings wherein:

BRIEF DESCRIPTION OF DRAWINGS

FIGS. 1A and 1B are a representation of how a PPI scope appears normally and when some of the range-line trigger pulses are not received;

FIG. 3 is a diagram illustrating the time sequence of the various pulses which are present in the circuit; and FIG. 4 is a block diagram of the components of the input-output counter.

DETAILED DESCRIPTION

Figure 2:
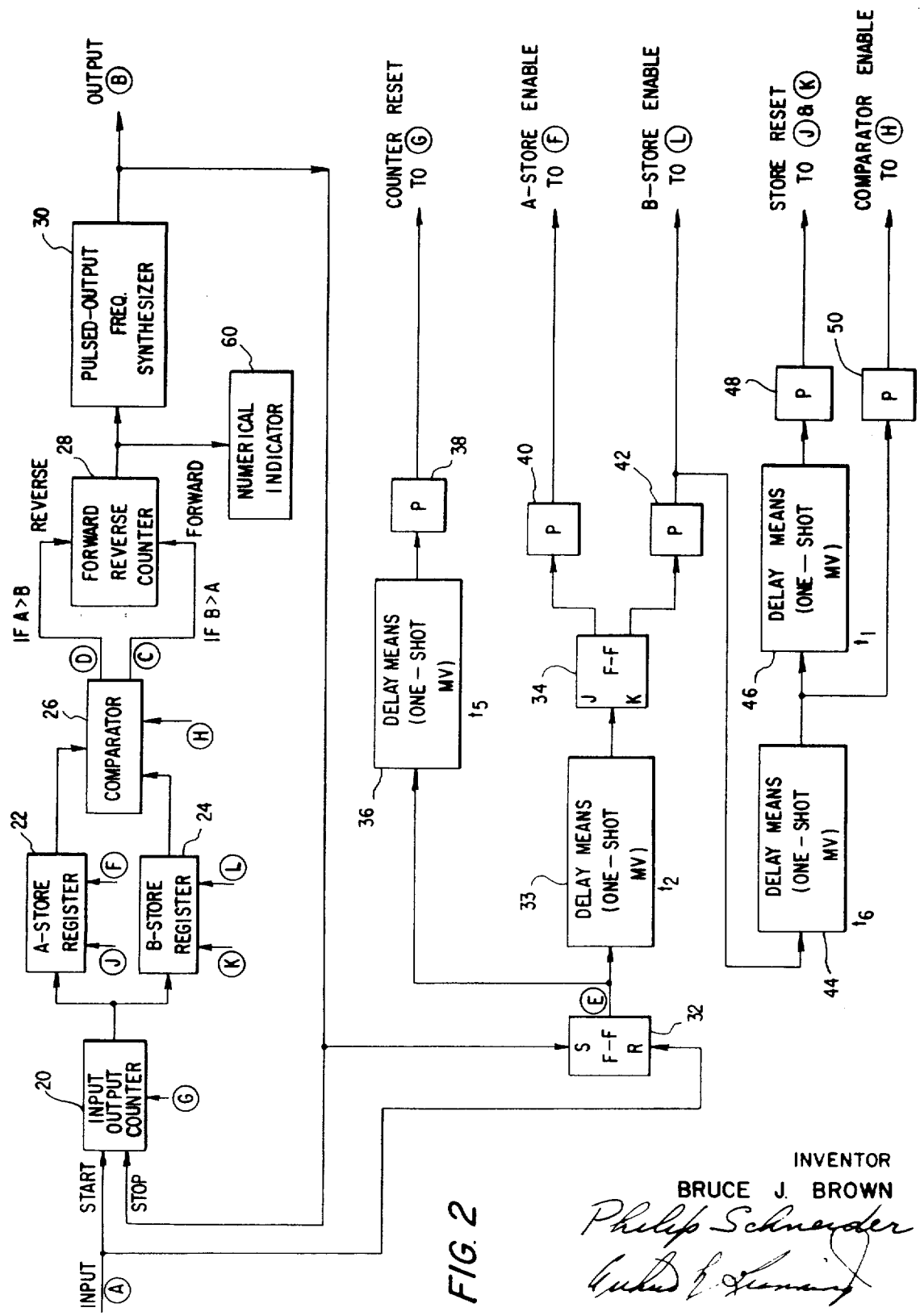
FIG. 2 is a block diagram of an embodiment of the invention.

FIG. 1A shows how a normal PPI video display 10 appears, the targets 12 being fairly well defined because all range lines 14 are present. In FIG. 1B, some of the trigger pulses are missing and no range line is generated without a trigger pulse. This leads to targets which are incomplete, or perhaps not presented at all if enough range lines are missing.

FIG. 2 is an embodiment of the invention, the counter 20, store registers 22 and 24, and comparator 26 comprising frequency-comparison means, the forward-reverse counter 28 comprising frequency control or command means and the pulsed-output frequency synthesizer comprising a free-running pulse-train generator. The remainder of the circuit comprises a control or logic circuit for controlling the operations of the counter 20, store registers 22 and 24 and comparator 26. The control circuit can be considered to be part of the frequency-comparison means.

The first input pulse starts the counter 20 running. The output pulses are fed back to the counter 20 and the first output pulse, whenever it occurs, stops the operation of the counter 20, the counter 20 in the meantime having measured or counted the time interval between the input and output pulse. A binary coded digital output signal corresponding to this time interval is stored in the A-store register.

The next input pulse starts the counter 20 again and the next output pulse stops it. The output of the counter 20 corresponding to this time interval is stored in the B-store register 24. The outputs of both store registers are fed to the comparator 26 which compares the two time intervals and provides output signals in accordance with the difference between them. A single bit or pulse is provided for each comparison. If the A-store time interval is greater than the B-store interval, the bit goes to the "reverse" input terminal of the forward-reverse counter 28. This orders the pulsed-output frequency synthesizer 30, which is an accurate free-running, pulse generator to decrease the repetition rate (or increase the period) of its output. If the B-store time interval is greater than the A-store interval, the bit goes to the "forward" input terminal of the pulsed-output frequency synthesizer 30 ordering it to increase the repetition rate (or decrease the period of its output). The output of the forward-reverse counter is a binary-coded digital signal.

This sequence of events continues for the succeeding sets of input and output pulses and eventually the frequencies become equal. The output pulses continue at the same frequency as before if one or more input pulses are missing.

The input-output counter 20 is started by the first input pulse (See FIG. 3) which also goes to the reset terminal of the S-R flip-flop 32, the output of which Ⓔ then becomes 0. The top output terminal of the J-K flip-flop 34 then has a 1 output and the bottom output terminal has an 0 output. The 1 output is fed to a one-shot monostable multivibrator (all such are labelled "P" in FIG. 2) 40 which sends out a pulse to the A-store enable input Ⓕ, permitting the output of the input-output counter 20 to be stored therein.

The output pulse Ⓑ of the synthesizer 30 which next arrives is fed to the set terminal of the S-R flip-flop 32 changing its output to a 1. The top output terminal of flip-flop 34 goes to 0 and the bottom to 1, causing multivibrator 42 to send a pulse Ⓛ to the B-store register 24 so that the next time-interval signal from the counter 20 is fed into the B-store register.

The B-store register enable pulse Ⓛ is also fed to a delay means 44 which comprises a one-shot multivibrator. The end of the pulse output of the delay means 44 is fed to a second one-shot multivabrator 50 which sends a pulse Ⓗ to the enable input of the comparator 26, thereby causing the comparator to operate.

The output Ⓔ of the S-R flip-flop 32 is also fed to delay means 36, which operates on the 1 signal which occurs when the output pulse is fed to the set terminal of S-R flip-flop 32. The amount of delay $t_5$ provided must be longer than the amount of operating delay $t_2$ produced by the one-shot multivibrator 33 so that the B-store register 44, which is enabled by pulse Ⓛ, has time to operate to store the signal from the counter 20 before the latter is reset.

The output from the bottom terminal of the J-K flip-flop 34 is fed through a one-shot multivibrator 42 to delay means 44 providing a delay $t_6$ which delays its occurrence until after the B-store enable pulse Ⓛ. It is then fed through delay means 46 providing another delay $t_1$ which delays its occurrence until after the pulses Ⓒ and Ⓓ which operate the forward-reverse counter 28. The output of delay means 46 is fed to one-shot multivibrator 48 which provides a reset pulse Ⓙ and Ⓚ to the store-registers 22 and 24. The circuit is then ready for another cycle. The timing of the various pulses is shown in FIG. 3.

FIG. 4 shows an implementation of the input-output counter 20. The input pulse train Ⓐ is fed to the set terminal of an S-R flip-flop 52. An input pulse fed to the set terminal provides a 1 output, which is fed to an AND gate 56 thereby opening the gate and permitting the pulse train from the clock 54 to be fed to a binary counter 58. The counter 58 operates until the output pulse Ⓑ from the synthesizer 30 is fed to the reset terminal of the flip-flop 52. This changes the flip-flop output to a 0 which closes the AND gate 56 so that no more clock pulses can be fed through the AND gate to the binary counter 58.

The components employed in the invention are standard commercial circuits. For example, Texas-Instrument Co. makes the following units which may be employed herein:

| | |
|---|---|
| Counter 58 | Model SN5490N/SN7490N |
| S-R flip-flop | Model SN5476N/SN7476N |
| J-K flip-flop | Model SN5472N/SN7472N |
| one-shot multivibrator | Model SN54121N/SN74121N |
| forward-reverse counter | Model SN54192N |

National Semiconductor Corp. makes a comparator, Model DM7200/DM8200, and General Radio Co. makes a frequency synthesizer, the type 1162, the output of which is a sine wave which can be fed into a one-shot monostable multivibrator to provide the pulsed-output frequency synthesizer 30.

By including a numerical indicator 60 (FIG. 2) at the output of the forward-reverse counter 28, the invention can be made to measure the frequency of the input pulse train Ⓐ. The numerical indicator 60 could comprise, for example, a binary-coded digital-to-seven-segment decoder which feeds a seven-segment display device. The display of a binary-coded digital signal is well-known in the art. This permits the input-pulse-train frequency to be measured with an accuracy equal to that of the frequency synthesizer 30. Also, the input frequency can be measured even though some of the pulses are missing.

Some important advantages of the invention are the following:

1. Flywheel Effect — An output is provided at the same frequency as before even when some of the pulses in the input pulse train are missing.

2. Wide Capture Range — The invention will lock in to an incoming pulse train even when there is a difference of as much as ±49 percent in frequency between the output frequency setting and the frequency of the input pulse train.

3. Locking to Harmonics — The invention will, in addition to locking-in to the frequency of the input pulse train, lock in to harmonics of the frequency of the input pulse train, if the forward-reverse counter is set to the harmonic frequency ±49 percent of the input frequency.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A pulse-train generator having an output whose frequency is automatically locked to the frequency of its input pulse train comprising, in combination:

frequency-comparison means to which the input and output pulse trains are fed for measuring the time interval between each input pulse and the next succeeding output pulse and for comparing every two successive measurements to determine which is larger, the first measurement being called the A measurement and the second the B measurement;

frequency-changing means to which the output of said comparison means is fed for generating a frequency-command signal corresponding to a pulse-train frequency, the frequency being increased or decreased in accordance with the determination of whether the B measurement is greater than the A measurement or vice versa; and free-running, pulse-train generating means to which the output of said frequency-changing means is fed for generating a train of output pulses, the frequency of said pulse train being determined by the input command signal to said pulse-train generating means.

2. A pulse-train generator as in claim 1, wherein said frequency-comparison means includes an input-output counter, a pair of store registers called an A-store register and a B-store register and a comparator, said counter being fed the input and output pulse trains and measuring the time interval between each input pulse and the next succeeding output pulse, said A-store register storing the first time-interval measurement and said B-store register storing the next time-interval measurement, and said comparator being fed the outputs of said store registers and comparing them to determine whether the A-store measurement is greater than the B-store measurement, or vice versa.

3. A pulse-train generator as in claim 1, wherein said frequency-changing means comprises a forward-reverse counter receiving a signal at its reverse input terminal from said frequency-comparison means if said A-measurement is greater than said B-measurement and at its forward terminal if said B-measurement is greater than said A-measurement, the output of said forward-reverse counter being a signal corresponding to a specific pulse-train frequency.

4. A pulse-train generator as in claim 1, wherein said pulse-train generator comprises a pulsed-output frequency synthesizer, the frequency of its output pulse train being determined by the command-signal input received from said frequency changing means.

5. A pulse-train generator as in claim 2, wherein said frequency-changing means further includes control circuit means for controlling the timing of said counter, registers and comparator so that they complete a cycle of two successive time-intervals measurements and are then cleared and reset to complete a cycle of the next two time-interval measurements.

6. A pulse-train generator as in claim 4, wherein the output of said comparator is a single pulse and the output of said frequency-changing means is a binary-coded digital signal.

7. In combination with a pulse-train generator as defined in claim 1 having an output whose frequency is automatically locked to the frequency of its input pulse train, a frequency-measuring circuit for measuring the frequency of the input pulse train comprising a numerical indicator for indicating the value of a binary-coded digital signal.

8. A combination as set forth in claim 7, wherein said numerical indicator comprises a binary-coded digital signal decoder and a display device for displaying the output signal of said decoder.

9. A pulse-train generator having an output whose frequency is automatically locked to the frequency of its input pulse train comprising, in combination:

frequency-comparison means including an input-output counter, a pair of store registers called an A-store and a B-store register, a comparator and control circuit means, said counter being fed the input and output pulse trains and measuring the time interval between each input pulse and the next succeeding output pulse, said time-interval measurements being made in pairs, said A-store register registering the first time-interval measurement of a pair and said B-store register registering the second timeinterval measurement of a pair, said comparator being fed the store-register outputs and comparing them to determine whether the A-store measurement is larger than the B-store measurement, or vice versa, said control circuit means including logic components for timing the operations of said counter, registers and comparator whereby the counter, registers and comparator are operated to make said time-interval measurements for a pair of input and output pulses and then are reset to make the same measurements for the next pair of pulses;

frequency-changing means comprising a forward-reverse counter, a pulse from said comparator being fed to the forward terminal if said B-store measurement is larger than said A-store measurement and to the reverse terminal if said A-store measurement is the larger, the output of said counter being a binary-coded, digital signal corresponding to a specific pulse-train frequency; and pulse-train generator means comprising a free-running, pulsed-output frequency synthesizer, the frequency of its output pulse train being determined by the output signal of said forward-reverse counter which feeds the synthesizer its input command signal.

* * * * *